US010305782B2

(12) United States Patent
Inamdar et al.

(10) Patent No.: US 10,305,782 B2
(45) Date of Patent: May 28, 2019

(54) MACHINE LEARNING-BASED MECHANISM FOR OPTIMAL INTERFACE SELECTION IN NETWORK ENVIRONMENTS EMPLOYING NETWORK ADDRESS TRANSLATION

(71) Applicant: Cisco Technology, Inc., San Jose, CA (US)

(72) Inventors: Kaustubh Inamdar, Bangalore (IN); Ram Mohan Ravindranath, Bangalore (IN); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 15/429,284

(22) Filed: Feb. 10, 2017

(65) Prior Publication Data
US 2018/0234333 A1 Aug. 16, 2018

(51) Int. Cl.
*H04L 12/721* (2013.01)
*H04L 12/707* (2013.01)
(Continued)

(52) U.S. Cl.
CPC ............ *H04L 45/123* (2013.01); *H04L 45/24* (2013.01); *H04L 47/122* (2013.01);
(Continued)

(58) Field of Classification Search
CPC ..... H04L 45/00; H04L 45/50; H04L 61/2564; H04L 67/1008; H04L 29/125;
(Continued)

(56) References Cited

U.S. PATENT DOCUMENTS 8,185,660 B2 5/2012 Perumal et al.
8,533,339 B2 9/2013 Wing et al.
(Continued)

OTHER PUBLICATIONS

D. Wing, et al., "Discovering, Querying, and Controlling Firewalls and NATs", draft-wing-behave-nat-control-stun-usage-05, BEHAVE, Internet-Draft, Oct. 16, 2007, 31 pages.

(Continued)

*Primary Examiner* — Awet Haile
(74) *Attorney, Agent, or Firm* — Edell, Shapiro & Finnan, LLC (57) ABSTRACT

A communication session is established between at least a first endpoint and a second endpoint, either or both of which is behind at least one network device in a network that performs network address translation. Candidate path information is obtained that indicates candidate paths in the network through which the communication session can traverse, taking into account, network address translation occurring in the network. The candidate path information is analyzed against training data and data about conditions observed on one or more candidate paths for the communication session with a machine learning-based interface selection process to produce path recommendation information indicating whether one or more candidate paths should or should not be used for the communication session between the first endpoint and the second endpoint. The path recommendation information is supplied to an endpoint in the communication session.

20 Claims, 4 Drawing Sheets

(51) Int. Cl.
  *H04L 12/803* (2013.01)
  *H04L 29/12* (2006.01)
(52) U.S. Cl.
  CPC ...... *H04L 61/2575* (2013.01); *H04L 61/2589* (2013.01); *H04L 61/2514* (2013.01)
(58) Field of Classification Search
  CPC ... H04L 65/1006; H04L 67/101; H04L 67/14; H04L 63/029; H04L 65/80; H04L 29/12009; H04L 45/302; H04L 47/2441; H04L 43/0829; H04W 72/085; H04W 72/10; H04W 40/24
  See application file for complete search history.

(56) References Cited

U.S. PATENT DOCUMENTS

| | | |
|---|---|---|
| 9,247,204 B1 | 1/2016 | Yin et al. |
| 2012/0246295 A1 | 9/2012 | Gonzalez-Banos et al. |
| 2015/0067033 A1 | 3/2015 | Martinsen et al. |
| 2016/0302128 A1 | 10/2016 | Anchan et al. |
| 2017/0317932 A1* | 11/2017 | Paramasivam ....... H04L 47/125 |
| 2018/0124123 A1* | 5/2018 | Moore ................ H04L 65/1069 |

OTHER PUBLICATIONS

V. Singh, et al., "Multipath RTP (MPRTP)", draft-ietf-avtcore-mprtp-03, AVT Core Working Group, Internet-Draft, Jul. 8, 2016, 41 pages.
H. Schulzrinne, et al., "RTP: A Transport Protocol for Real-Time Applications", Network Working Group, RFC 3550, , Jul. 2003, 90 pages.
J. Rosenberg, "Interactive Connectivity Establishment (ICE): A Protocol for Network Address Translator (NAT) Traversal for Offer/Answer Protocols", Internet Engineering Task Force (IETF), RFC 5245, Apr. 2010, 117 pages.
J. Rosenberg, et al., "Session Traversal Utilities for NAT (STUN)", Network Working Group, RFC 5389, Oct. 2008, 51 pages.
R. Mahy, et al., "Traversal Using Relays around NAT (TURN): Relay Extensions to Session Traversal Utilities for NAT (STUN)", Internet Engineering Task Force (IETF), RFC 5766, Apr. 2010, 67 pages.

\* cited by examiner

MACHINE LEARNING-BASED MECHANISM FOR OPTIMAL INTERFACE SELECTION IN NETWORK ENVIRONMENTS EMPLOYING NETWORK ADDRESS TRANSLATION

TECHNICAL FIELD

The present disclosure relates to networking in environments that use network address translation.

BACKGROUND

In network environments that use network address translation (NAT), selecting the path (defined by a pair of transport address) over which communication is to be supported between two endpoints is important. This is because impairments, such as jitter, delay and packet drops, on a given path can greatly degrade the quality of the communication session. In the case of real-time communications (voice, video, etc.), the consequences of jitter, delay and packet drops can be devastating in terms of user perception and whether or not the call is ultimately successful.

DESCRIPTION OF EXAMPLE EMBODIMENTS

Overview

In one embodiment, a communication session is established between at least a first endpoint and a second endpoint, either or both of which is behind at least one network device in a network that performs network address translation. Candidate path information is obtained that indicates candidate paths in the network through which the communication session can traverse, taking into account, network address translation occurring in the network. The candidate path information is analyzed against training data and data about conditions observed on one or more candidate paths for the communication session with a machine learning-based interface selection process to produce path recommendation information indicating whether one or more candidate paths should or should not be used for the communication session between the first endpoint and the second endpoint. The path recommendation information is supplied to an endpoint in the communication session.

Example Embodiments

Presented herein is a method that uses machine-learning to converge on a transport address pair most conducive to communication between peers in a networking environment in which network address translation is occurring.

Figure 1:
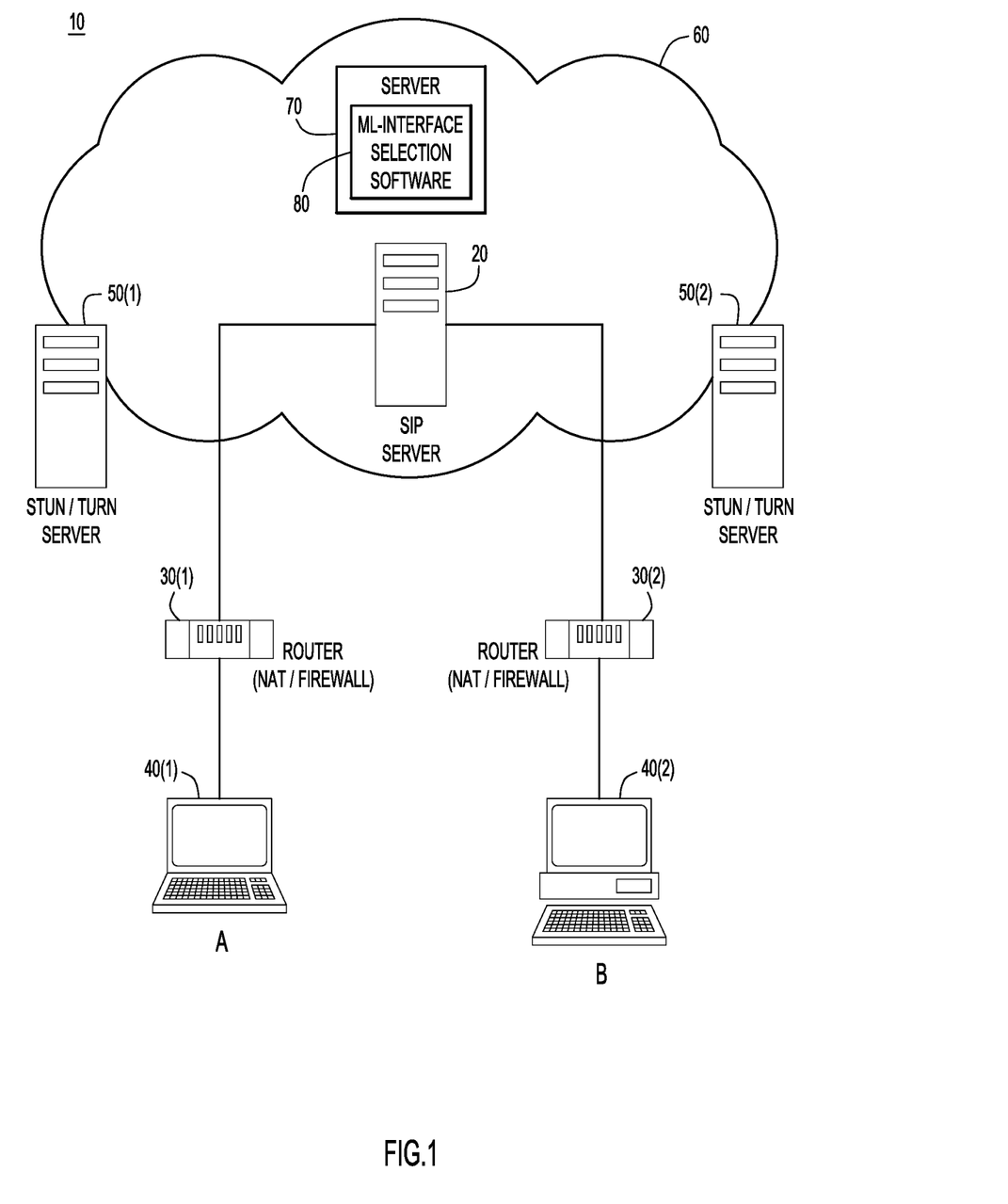
FIG. 1 is block diagram of a network environment that employs network address translation, and in which machine-learning techniques are used to converge on a path to be used for communication between endpoints, according to an example embodiment.

With reference to FIG. 1, a networking environment 10 is shown that includes a Session Initiation Protocol (SIP) server 20, routers 30(1) and 30(2), and peer devices/endpoints A and B shown at reference numerals 40(1) and 40(2), respectively. There are also STUN/TURN servers 50(1) and 50(2) in the network environment 10. The routers 30(1) and 30(2) are configured as NAT/firewall devices. The SIP server 20 is shown as part of a cloud network 60.

Both endpoints 40(1) and 40(2) are behind their respective NATs (routers 30(1) and 30(2), respectively) though they may not be "aware" of the network address translation that is performed by the routers 30(1) and 30(2). The type of network address translation used and its properties are also unknown. Endpoints 40(1) and 40(2) are capable of engaging in an offer/answer exchange by which they can exchange Session Description Protocol (SDP) messages. The purpose of the offer/answer exchange is to set up a media session between endpoints 40(1) and 40(2). This exchange normally occurs through the SIP server 20.

When devices are behind NAT's and use a path selection protocol, such as the Interactive Connectivity Establishment (ICE) protocol, to converge on a pair of transport addresses, the addresses which are chosen may be either reflexive or relayed candidates. With relayed and reflexive candidates, some degree of impairment of data transmission is expected due to operations on servers that use Traversal Using Relay NAT (TURN) (as specified in IETF RF 5766) and Session Traversal Utilities for NAT (STUN) (as specified in IETF RFC 5389).

ICE is one example of a technology that may be used in concert with STUN or TURN servers, e.g., STUN/TURN servers 50(1) and 50(2), to select interfaces used for a communication session between endpoints where network address translation is occurring in the network.

ICE is a protocol that was designed to aid in reliably setting up communication sessions between devices resident behind NAT's in a real-time communications environment, but was soon extended to include just about any type of flow, including Transmission Control Protocol/Transport Layer Security/Datagram Transport Layer Security (TCP/TLS/DTLS). In other words ICE can be used for any flow that uses a random 5 tuple and either peer does not use a well-defined port. ICE can work for peer-to-peer file transfer, NAT traversal as well as for real-time communications (video, voice, real-time communication in web-browsers (webRTC).

ICE is an extension to the offer/answer model, and works by including a multiplicity of IP addresses and ports in SDP offers and answers which are then tested for connectivity by peer-to-peer connectivity checks. The IP addresses and ports included in the offer/answer messages with the Session Description Protocol (SDP) (IETF RFC 3264) and the connectivity checks are performed using the revised STUN specification.

In ICE, each endpoint has a variety of candidate transport addresses (combination of IP address and port for a particular transport protocol, e.g., User Datagram Protocol (UDP) it could use to communicate with the other endpoint. (In ICE terminology, the endpoints are called "agents".) The transport addresses may include: a transport address on a directly attached network interface, a translated transport address on the public side of a NAT (called a "server reflexive" address") and a transport address allocated from a TURN server (called a "relayed address").

Any of endpoint A's candidate transport addresses can be used to communicate with any of endpoint B's candidate transport addresses. In practice, however, many combinations will not work. For example, if endpoints 40(1) and 40(2) are both behind NATs, their directly attached interface addresses are unlikely to be able to communicate directly. The purpose of techniques, such as those employed by ICE, is to discover which pairs of addresses will work. The way that ICE does this is to systematically try all possible pairs (in a sorted order) until it finds one or more that work.

1. ICE gathers candidate addresses for endpoint A 40(1), these candidates include:
   Host candidates (wireless local area network/Wi-Fi®, virtual private network (VPN), local area network (LAN) etc.)
   Reflexive candidates (learned by a STUN Binding request)
   Relayed candidates (learned by a TURN allocate transaction)
2. Once ICE gathers potential candidates for an endpoint, it assigns them priority values (assignment of priority values to different candidate types are governed by the guidelines of IETF RFC 5245).
3. The support for ICE and list of potential candidates with priority values are advertised to the remote peer.
4. The remote peer endpoint 40(2) then performs the same task of gathering candidate addresses for pairing and sends an answer that includes lists of its own candidates and their priority values.
5. At this point, both peers have a list of all potential candidates and can go about combining candidates from both sides to come up with "candidate pairs".
6. Next, connectivity checks are performed for these different candidate pairs bi-directionally via STUN Request/Response transactions.
7. Once connectivity checks conclude, the candidate pair with the highest priority that successfully passed connectivity checks is chosen.

According to the embodiments presented herein, a server 70 in the cloud 70 executes machine-learning (ML) interface selection software 80 to perform operations described in more detail below to improve the selection of a path used by endpoints in a network environment in which one or more of the endpoints is behind network address translation. It should be understood that the functions of the machine-learning interface selection software 80 described herein may be integrated to the SIP server 20. Further still, the functions of the ML interface selection software 80 could be implemented by an endpoint itself, either in software or hardware, e.g., in one or more application specific integrated circuits (ASICs).

Figure 2:
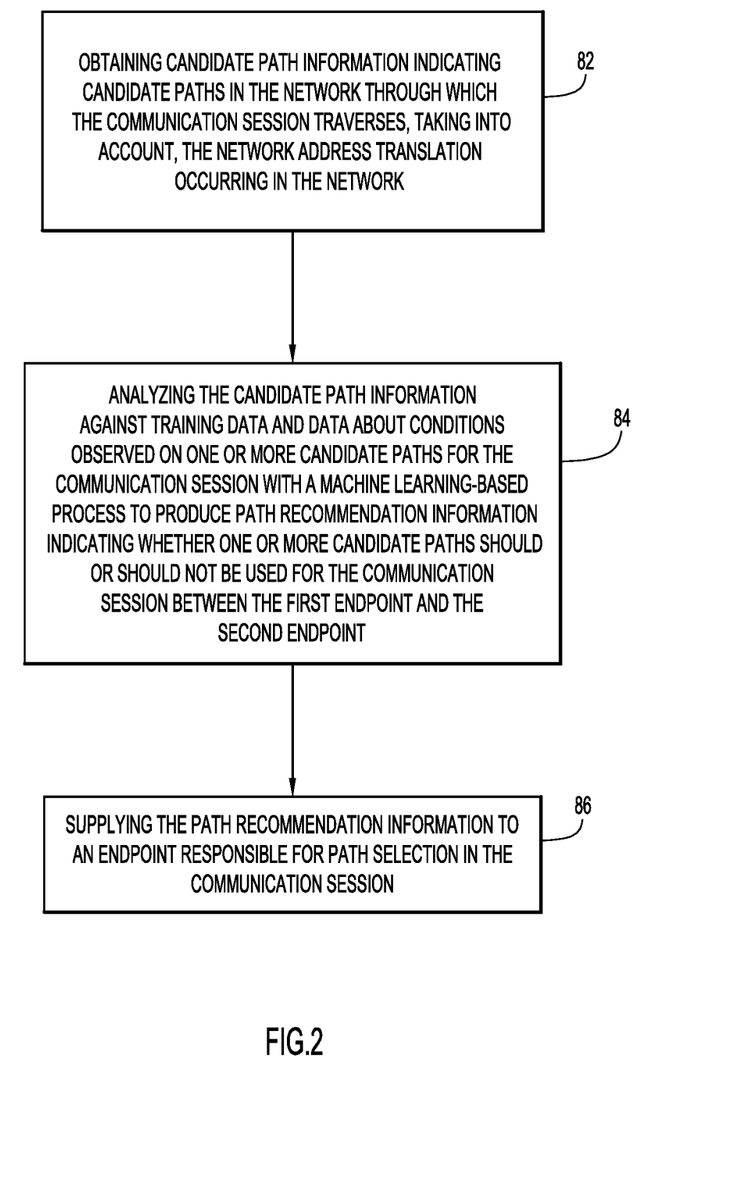
FIG. 2 is a high-level flowchart of a machine-learning process that assists in selecting a path for use in communication between endpoints, according to an example embodiment.

Turning now to FIG. 2, a flowchart is shown that generally depicts, at a high-level, the operations of the ML interface selection software 80. The process depicted in FIG. 2 is performed in connection with a communication session between at least a first endpoint and a second endpoint, either or both of which is behind at least one network device in a network that performs network address translation. At 82, candidate path information is obtained that indicates candidate paths in the network through which the communication session traverses, taking into account, the network address translation occurring in the network. At 84, the candidate path information is analyzed against training data with a machine learning-based interface selection process to produce path recommendation information indicating whether one or more candidate paths should or should not be used for the communication session between the first endpoint and the second endpoint. At 86, the path recommendation information is supplied to an endpoint that is responsible for (in charge of) path selection in the communication session. Such endpoint may be the first endpoint, the second endpoint or some other endpoint in the communication session. In the case of ICE, the entity that selects the path(s) for media transmission is called the "controlling agent."

Figure 3:
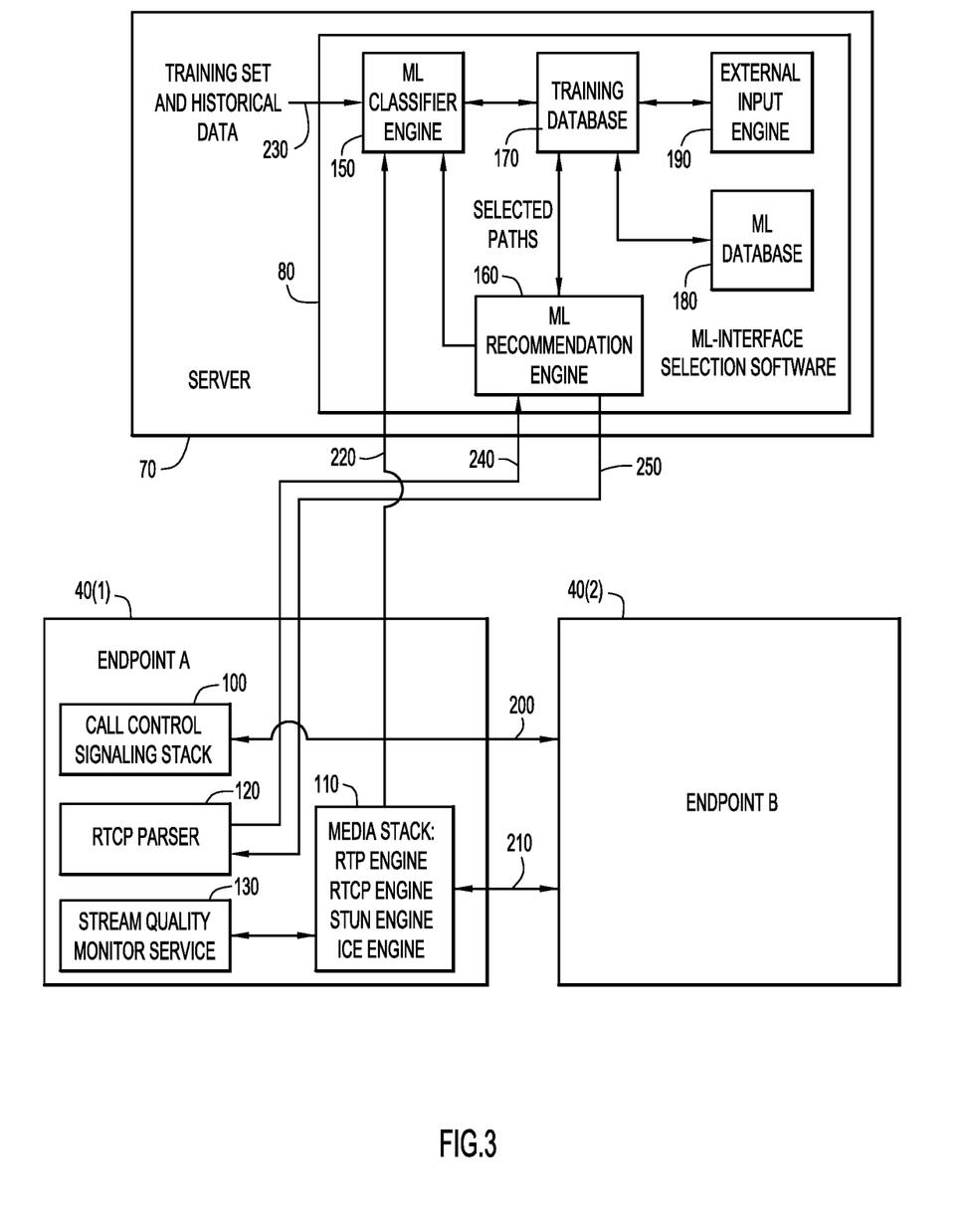
FIG. 3 is a more detailed diagram depicting the machine-learning process, according to an example embodiment.

Reference is now made to FIG. 3 for a more detailed description of the operations of the server 70. The example described below in connection with FIG. 3 refers to the use of Real-time Transport Protocol (RTP) and the RTP Control Protocol (RTCP) (both as specified in IETF RFC 3550), but this is by example only and is not meant to be limiting. The data channel used can be of any media type. For example, the data channel could be from an application, file, sensor data, etc. As part of Web Real-Time Communication (webRTC) call/SIP call setup, multiple data channels would be negotiated. ICE type of procedures may be applied on these data channels to select a 5-tuple over which to send data. Thus, while the description herein refers to RTP media and its control protocol RTCP, the data can be of any data type now known or hereinafter developed.

RTP is a protocol used to transmit real-time media (voice/video) between devices communicating in a multimedia session. RTCP is a peer protocol to RTP that describes the characteristics of the session via RTCP reports that are exchanged at regular intervals between communicating peers. By parsing these reports it is possible to understand different attributes of the communication session, like jitter, latency, packet drops etc.

The method presented herein uses an RTCP parser that is co-resident on the endpoint and made to parse RTCP reports in good to average conditions. Good conditions means, for example, jitter and latency are within established industry limits; no drops of RTP packets. Average conditions means, for example, slight skew of jitter and latency beyond defined industry limits; few packet drops so as to affect voice/video quality to a tolerable extent.

Thus, as shown in FIG. 3, and using endpoint A 40(1) as an example, endpoint A includes a call control signaling stack 100, a media stack 110, an RTCP parser 120, and a stream quality monitor service 130. Examples of functions of the call control signaling stack 100 include SIP User Agent (UA) functions and webRTC stack functions. The media stack functions 110 include an RTP engine, RTCP engine, STUN engine and ICE engine. Again, it is to be understood that the media stack can include a generic application data channel that can carry any data type as desired by a given application, including presentation video, files, IoT sensor data, etc.

The ML-interface selection software 80 running on the server 70 includes a ML classifier engine 150, a ML recommendation engine 160, a training database 170, a ML database 180 and an external input engine 190 for static data.

At 200, call control setup and offer/answer negotiation is performed between endpoint A 40(1) and endpoint B 40(2). The call control signaling stack 110 participates in operation 200. At 210, a connectivity check functionality running on the endpoint 40(1) performs connectivity checks to determine which paths are reachable between endpoint 40(1) and endpoint 40(2). The paths identified in operation 210 are candidate paths. In one non-limiting example, the connectivity check functionality is the aforementioned ICE technology.

At 220, the RTCP function of the media stack 110 generates data vectors (set of data) that are sent to the ML classifier engine 150. The data vector may include:
  D1: RTCP(attribute1, attribute2, . . . )
  D2: Mean Opinion Score (MOS)(attribute1, attribute2, . . . )

where for RTCP, the attributes include measurement values or levels (poor, average, good) for jitter, latency, and packet drops, generated by the endpoint 40(1). In general, the RTCP and MOS attributes are representative of communication session quality (e.g., voice quality) metrics generated by the endpoint during the communication session.

In another embodiment, in addition to data vectors D1 and D2, stream quality monitor service 130 provides the following additional data vectors that may be included in the data sent from the endpoint to the ML classifier engine 150:

STUN Round Trip Time (RTT)—D3: STUN RTT

Call Detail Records (CDRs)—D4: CDR(attribute1, attribute2, . . . ). The CDRs could be generated by the endpoints or by any network devices in the path of the communication session between the endpoints.

Call Quality Feedback from User (a more refined representation than MOS)—User Feedback(attribute1, attribute2, . . . ). This may be unique to a particular system or service deployment, and examples of attributes may be audio volume, echo, etc. This user quality feedback may be sent in metadata attached to packets during a communication session in response to a user keypad selection, or after a communication session has completed.

A supervised learning process is used in which the data for numerous communication sessions serve as a training set for the ML classifier engine 150, as shown at reference numeral 230. Over a period of time, e.g., several hours or more, using the historical data 230 and the data obtained at 220 for a communication session being setup, the ML process determines whether the candidate paths discovered at 210 during setup of the communication session are going to be able to support good quality real-time traffic (e.g., audio only or audio/video). For example, if the connectivity checks at 210 indicate that 3 paths between endpoints 40(1) and 40(2) are viable, but the ML process has determined that path 2 historically has had poor quality (poor latency, high packet drops, etc.), then path 2 may be ruled out in the ultimate selection of interfaces to be used for the communication session between endpoints 40(1) and 40(2). Many voice and video services maintain call logs for numerous communication sessions and the training set and historical data may be obtained from call logs for calls conducted over a period of time, half-hour, hour, day, etc., to train the ML classifier 150.

Through the supervised learning process, baseline metrics for jitter, latency, packet drops, MOS, CDR, User Feedback, and STUN RTT are established. This allows the ML classifier engine 150 to assign report interpretations and by extension, session characteristics of paths to different classes such as: "Excellent", "Tolerable", and "Poor". As an example, in the context of ICE candidate pairs, this is done for each candidate type and for different candidates of the same type (host candidate: Wi-Fi® and virtual private networking (VPN)). The ML classifier engine 150 may use any of a variety of classification algorithms (logistic regression, etc.) for determining the classification and this may vary based on observed results and training time. The ML classifier engine 150 also updates the training database 170. The external input engine 190 may also supply static data to the training database. Examples of static data include data associated with planned events. For example, if there is an online meeting at a particular time and it is expected that 100 users will join from a location, the bandwidth on a link for the branch for that location would be at a maximum. The ML classifier engine 150 may make decisions/predictions based on such planned events. Other examples of static data include historical data at a given time of day for a given path. Historical data may include call success rate on a given path, call quality on a given path, average load, etc.

As shown at 230, historical RTCP reports along with the candidate type involved in the communication session can also be used to further "prime" the ML classifier engine 150. Each one of these data vectors have their corresponding attributes. The number of attributes may be scoped so as to not introduce a "curse of dimensionality" problem, and if they are found to do so, dimensionality reduction algorithms can be used.

Within a time frame T (consisting of N communication sessions) the RTCP parser 120 can "learn" the streaming characteristics of a given candidate pair by several passes through the path selection algorithm. If it is determined that a particular path (e.g., a particular candidate pair in the case of ICE) consistently produces conditions that are not conducive for a good quality media session, at 240, the RTCP parser 120 forwards this information to the ML recommendation engine 160 along with type information (e.g., the candidate pair type) and the biggest contributing factor for bad quality (jitter, latency, packet drops etc.). Thus, more generally, at 240, "real-time" data about conditions observed on one or more candidate paths in the communication session is forwarded by the RTCP parser 120 to the ML recommendation engine 160 for use, together with training data, in analyzing candidate path information.

The ML recommendation engine 160 analyzes a plurality of factors and generates path recommendation information for the endpoint. These factors include:
 a) classification made by the ML classifier engine 150;
 b) type of data transmission session (real-time/non real-time; if real-time, whether it is voice, video, fax over-IP (FOIP), IoT sensor data, etc.); and
 c) desired flow characteristics. Examples of flow characteristics include, for real-time communications, characteristics such as end-to-end packet delay, jitter, latency, acceptable packet loss percentage, desired media codec, etc.

At 250, the ML recommendation engine 160 sends the path recommendation information to an endpoint that is responsible for path selection in the communication session. This may endpoint 40(1), endpoint 40(2) or some other endpoint. Based on the recommendations from the ML recommendation engine 160, that endpoint can take any of several actions. For example, the endpoint can choose to do the following to ensure that quality of real-time communications is not impaired:
 a) Fail all STUN checks (those that are to be performed under IETF RFC 5389) for the given candidate pair for a time interval T, and allow the network or intermediaries to recover. In this way, another candidate pair can be chosen, and ultimately a "valid" candidate pair is chosen.
 b) The endpoint can upgrade the session to Multipath RTP (MPRTP) (https://tools.ietf.org/html/draft-ietf-avtcore-mprtp) and use a plurality of transmission paths by using the recommendations made at 250.

Furthermore, as explained above, communication session quality data may be received from any endpoint (endpoint 40(1), endpoint 40(2) or some other endpoint) in the communication session, such that the ML-based analysis performed by the ML recommendation engine 160 is based on the communication session quality data as well. The communication session quality data may indicate a quality of the communication session, including one or more of: jitter, latency or packet drops. The communication session quality data may further include call detail records and user quality feedback.

By this technique, the operational efficiency of path selection is improved in terms of converging on a particular path. Moreover, by supervised learning of the ML classifier engine, this process can be highly optimized for the actual data flow (whether real-time or non real-time).

The following is an example of how the ML process can adapt the ICE candidate selection process. It is again noted that the reference to ICE is only by way of example only, and not intended to limit the usefulness of the ML process for path selection when NAT is employed in the network.

Candidate Gathering. During the candidate gathering step of ICE, each ICE agent gathers all possible candidates, including candidates on its host interfaces, relay servers, learned reflexive addresses. Eventually the ICE agent sends all these candidates to its peer in SDP. All the candidates are given a priority which is computed using the formula defined in section 4.1.2, of RFC 5245.

Using the ML process described above, one way to manipulate/compute priority of a candidate pair is based on ML feedback. The priority formula for each candidate pair can be computed using an enhanced formula where the "type preference" and "local preference" can be assigned values based on the ML feedback. The ML classifier engine 150 is fed data about the interface from which the candidate is allocated. Based on history/past information that the ML classifier engine 150 has on that interface/relay server/path, the ML classifier engine 150 will derive a value (such as between 0 and 1). This value is a multiplication factor that can be used to compute "type preference" and "local preference" from its existing range (1 to 126 and 65535 to 0). The priority of a candidate pair may be updated at any time during the call based on on-going feedback, as described above. This can trigger an ICE restart if the priority of the currently nominated candidate pair reduces below a threshold, for example.

Connectivity Checks. Once candidates are gathered, they are exchanged between peers, such as via SDP. Thereafter, the ICE agent on each endpoint pairs them to start connectivity checks. Typically, the pair is formed based on priority and pairs, like host candidates, are checked first. The ML feedback can be used to get the past history/on-going feedback, determine whether a pair (5-tuple) has a better path characteristics, and prioritize the connectivity check for that pair before other pairs.

ICE Conclusion: Once connectivity checks for different pairs are completed, if there are multiple pairs that are reachable, the ICE agent selects a pair based on local preference, pair priority. Here again, ML feedback can be used to select a pair that has better path characteristics as indicated by the ML recommendation engine 160.

The following is one example use case. A web-based collaboration system uses candidate pair selection techniques, such as ICE. The media servers of the collaboration system in the cloud are distributed around the world and the endpoints are expected to use a candidate pair selection technique, such as ICE, to select a best relay server (path). The techniques described herein are used to improve the candidate pair selection. Rather than a static mechanism to allocate a client/endpoint to a media relay device, the ML-based solution presented herein is used.

The techniques described herein are applicable to any data flow, including those that use the following protocols (without limitation): Universal Datagram Protocol (UDP), Transmission Control Protocol (TCP), Transport Layer Security (TLS), Datagram TLS (DTLS). These techniques are also not restricted to use with real-time communications.

Figure 4:
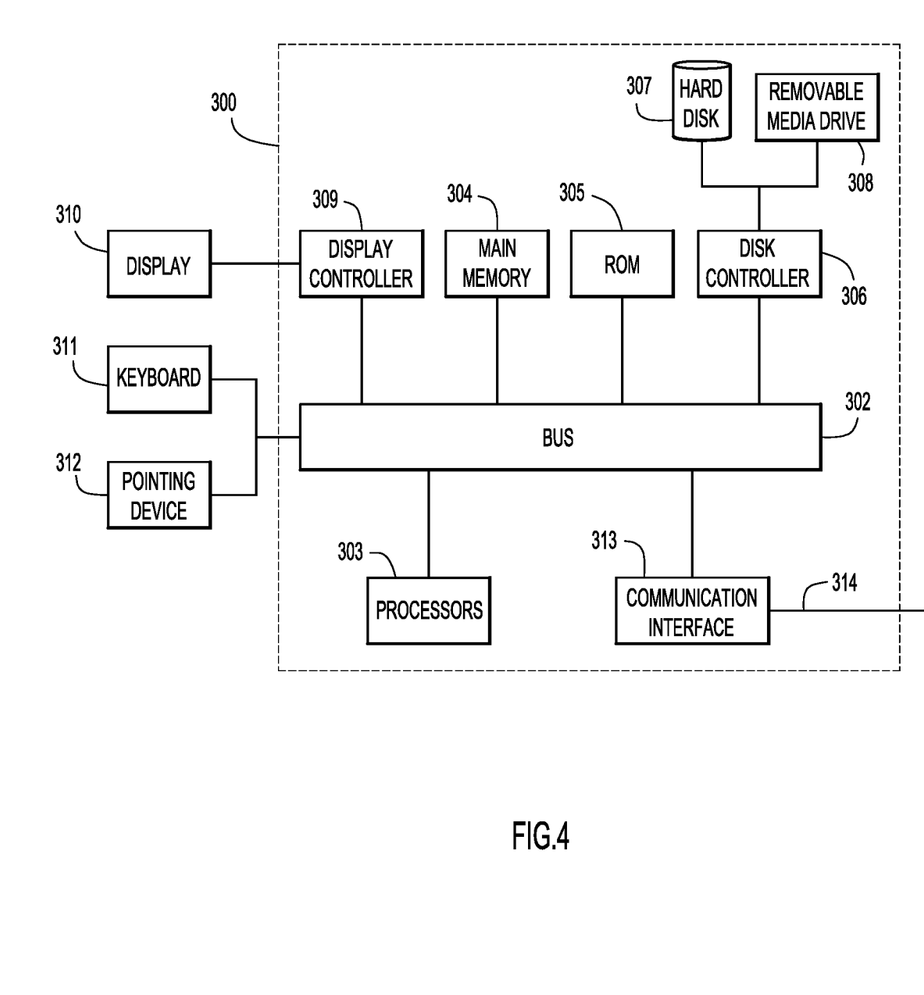
FIG. 4 is a hardware block diagram of a device that may be configured to perform the machine-learning process, according to an example embodiment.

Reference is now made to FIG. 4. FIG. 4 shows a block diagram of a device that may be configured to perform the operations described above. The block diagram of FIG. 4 is meant to be representative of the server 70, SIP server 20 or endpoints 40(1) and 30(2) shown in FIG. 1, which may perform the operations described above in connection with FIGS. 1-3.

The device 300 includes a bus 302 or other communication mechanism for communicating information, and a processor 303 coupled with the bus 302 for processing the information. While the figure shows a single block 303 for a processor, it should be understood that the processors 303 represent a plurality of processing cores, each of which can perform separate processing. The device 300 also includes a main memory 304, such as a random access memory (RAM) or other dynamic storage device (e.g., dynamic RAM (DRAM), static RAM (SRAM), and synchronous DRAM (SD RAM)), coupled to the bus 302 for storing information and instructions to be executed by processor 303. In addition, the main memory 304 may be used for storing temporary variables or other intermediate information during the execution of instructions by the processor 303.

The device 300 further includes a read only memory (ROM) 305 or other static storage device (e.g., programmable ROM (PROM), erasable PROM (EPROM), and electrically erasable PROM (EEPROM)) coupled to the bus 302 for storing static information and instructions for the processor 303.

The device 300 also includes a controller 306 coupled to the bus 302 to control one or more storage devices for storing information and instructions, such as a magnetic hard disk 307, and a removable media drive 308 (e.g., floppy disk drive, read-only compact disc drive, read/write compact disc drive, compact disc jukebox, tape drive, and removable magneto-optical drive). The storage devices may be added to the device 300 using an appropriate device interface (e.g., small computer system interface (SCSI), integrated device electronics (IDE), enhanced-IDE (E-IDE), direct memory access (DMA), or ultra-DMA).

The device 300 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The device 300 may also include a display controller 309 coupled to the bus 302 to control a display 310, such as a Liquid Crystal Display (LCD) or other now known or hereinafter developed display technologies, for displaying information to a computer user. The device 300 includes input devices, such as a keyboard 311 and a pointing device 33, for interacting with a computer user and providing information to the processor 303. The pointing device 312, for example, may be a mouse, a trackball, or a pointing stick for communicating direction information and command selections to the processor 303 and for controlling cursor movement on the display 310.

The device 300 performs a portion or all of the processing steps of the process in response to the processor 303 executing one or more sequences of one or more instructions contained in a memory, such as the main memory 304. Such instructions may be read into the main memory 304 from another computer readable medium, such as a hard disk 307 or a removable media drive 308. One or more processors in a multi-processing arrangement may also be employed to execute the sequences of instructions contained in main memory 304. In alternative embodiments, hard-wired circuitry may be used in place of or in combination with software instructions. Thus, embodiments are not limited to any specific combination of hardware circuitry and software.

As stated above, the device 300 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the device 300, for driving a device or devices for implementing the process, and for enabling the device 300 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The device 300 also includes a communication interface 313 coupled to the bus 302. The communication interface 313 provides a two-way data communication coupling to a network link 314 that is connected to, for example, a local area network (LAN), or to another communications network such as the Internet. For example, the communication interface 313 may be a wired or wireless network interface card to attach to any packet switched (wired or wireless) LAN. Wireless links may also be implemented. In any such implementation, the communication interface 313 sends and receives electrical, electromagnetic or optical signals that carry digital data streams representing various types of information.

To summarize, presented herein ML classification techniques to converge on the most optimal transport flow/flows for transfer of real-time/non real-time data. These techniques can provide useful optimizations to path selection protocols when traversing a network that employs network address translation. One example of such a protocol is the ICE protocol.

The operational efficiency of the path selection protocol is improved in terms of converging on a particular candidate pair. By supervised learning of an ML classifier, this process can be highly optimized for the actual data flow (whether real-time or non real-time). The user experience may be improved, particularly when multiple streams are involved in a real-time communication session across the Internet, where one of the endpoint is in a network whose conditions change often. As one example, these techniques are useful in large online conferences where multiple endpoints join from different locations. The feedback from the ML process can be used by a switched conference solution to select the best optimal path to stream media.

In summary, in one form, a method is provided for use in a communication session between at least a first endpoint and a second endpoint, either or both of which is behind at least one network device in a network that performs network address translation, including steps of: obtaining candidate path information indicating candidate paths in the network through which the communication session can traverse, taking into account, network address translation occurring in the network; analyzing the candidate path information against training data and data about conditions observed on one or more candidate paths for the communication session with a machine learning-based interface selection process to produce path recommendation information indicating whether one or more candidate paths should or should not be used for the communication session between the first endpoint and the second endpoint; and supplying the path recommendation information to an endpoint that is responsible for path selection in the communication session.

As explained above, the communication session quality data may include one or more of: jitter, latency or packet drops, and in another form, may further include call detail records and user quality feedback.

The method may further include supplying to the machine learning-based interface selection process historical and training data pertaining to communication sessions conducted over paths in the network.

The analyzing operation may include classifying candidate paths to different classes based on the communication session quality data. The analyzing operation may produce the path recommendation information based on the classifying, type of communication session, and flow characteristics of the communication session. The path recommendation information may include an indication that a particular path is not to be selected during a connectivity check phase between the first endpoint and the second endpoint. The path recommendation information may include an indication that the first endpoint (or any other endpoint) should switch to a multipath session.

As explained above, the candidate path information may indicate candidate pairs of interfaces obtained by the first endpoint according to the Interactive Connectivity Establishment (ICE) standard. In this case, the path recommendation information may include a multiplication factor that is used to compute a type reference or local preference for a candidate pair of interfaces obtained according to the ICE standard. Furthermore, the analyzing operation may include using the path recommendation information produced by the machine learning-based interface selection process to adapt/influence/manipulate assignment of priority of candidate pairs according to the ICE standard.

In another form, an apparatus is provided including: a communication interface configured to enable communication in a network in which a communication is occurring between a first endpoint and a second endpoint, wherein either or both of the first endpoint or second endpoint is behind at least one network device in the network that performs network address translation; a processor coupled to the communication interface, wherein the processor is configured to: obtain candidate path information indicating candidate paths in the network through which the communication session can traverse, taking into account, network address translation occurring in the network; analyze the candidate path information against training data and data about conditions observed on one or more candidate paths for the communication session with a machine learning-based interface selection process to produce path recommendation information indicating whether one or more candidate paths should or should not be used for the communication session between the first endpoint and the second endpoint; and supply the path recommendation information to an endpoint that is responsible for path selection in the communication session.

In still another form, one or more non-transitory computer readable storage media are provided encoded with instructions that, when executed by a processor, cause the processor to: in a communication session between at least a first endpoint and a second endpoint, either or both of which is behind at least one network device in a network that performs network address translation, obtain candidate path information indicating candidate paths in the network through which the communication session can traverse, taking into account, network address translation occurring in the network; analyze the candidate path information against training data and data about conditions observed on one or more candidate paths for the communication session with a machine learning-based interface selection process to produce path recommendation information indicating whether one or more candidate paths should or should not be used for the communication session between the first endpoint and the second endpoint; and supply the path recommendation information to an endpoint that is responsible for path selection in the communication session.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    upon initiating a communication session between at least a first endpoint and a second endpoint, either or both of which is behind at least one network device in a network that performs network address translation, obtaining candidate path information associated with a plurality of candidate paths in the network through which the communication session can traverse, taking into account network address translation occurring in the network;
    analyzing the candidate path information using (i) training data for the plurality of candidate paths, and (ii) data about conditions observed on one or more candidate paths of the plurality of candidate paths for the communication session with a machine learning-based interface selection process to produce path recommendation information indicating whether one or more candidate paths of the plurality of candidate paths should or should not be used for the communication session between the first endpoint and the second endpoint;
    wherein analyzing the candidate path information with the machine learning-based interface selection process includes using:
        at least information associated with a type of data transmission for the communication session between the first endpoint and the second endpoint; and
        desired flow characteristics for the communication session between the first endpoint and the second endpoint, wherein the flow characteristics include one or more of end-to-end packet delay, jitter, latency, acceptable packet loss percentage, or desired media codec;
    supplying the path recommendation information to an endpoint that is responsible for path selection in the communication session; and
    establishing the communication session between the first endpoint and the second endpoint according to the path recommendation information.

2. The method of claim 1, further comprising receiving from any endpoint in the communication session, communication session quality data indicating a quality of the communication session, and wherein analyzing is further based on the communication session quality data.

3. The method of claim 2, wherein the communication session quality data includes one or more of: jitter, latency, or packet drops.

4. The method of claim 3, wherein the communication session quality data further includes call detail records and user quality feedback.

5. The method of claim 2, further comprising supplying to the machine learning-based interface selection process historical and training data pertaining to communication sessions conducted over paths in the network.

6. The method of claim 2, wherein analyzing includes classifying candidate paths of the plurality of candidate paths to different classes based on the communication session quality data.

7. The method of claim 6, wherein analyzing produces the path recommendation information based on the classifying, type of communication session, and the desired flow characteristics of the communication session.

8. The method of claim 6, wherein the path recommendation information includes an indication that a particular path is not to be selected during a connectivity check phase between the first endpoint and the second endpoint.

9. The method of claim 6, wherein the path recommendation information includes an indication that the first endpoint should switch to a multipath session.

10. The method of claim 1, wherein the candidate path information indicates candidate pairs of interfaces obtained by the first endpoint according to the Interactive Connectivity Establishment (ICE) standard.

11. The method of claim 10, wherein the path recommendation information includes a multiplication factor that is used to compute a type reference or local preference for a candidate pair of interfaces obtained according to the ICE standard.

12. The method of claim 10, wherein analyzing further includes using the path recommendation information to adapt assignment of priority of candidate pairs according to the ICE standard using the path recommendation information produced by the machine learning-based interface selection process.

13. An apparatus comprising:
    a communication interface configured to enable communication in a network in which a communication is occurring between a first endpoint and a second endpoint, wherein either or both of the first endpoint or second endpoint is behind at least one network device in the network that performs network address translation;
    a processor coupled to the communication interface, wherein the processor is configured to:
        upon initiating a communication session between the first endpoint and the second endpoint, obtain candidate path information associated with a plurality of candidate paths in the network through which the communication session can traverse, taking into account network address translation occurring in the network;

analyze the candidate path information using (i) training data for the plurality of candidate paths, and (ii) data about conditions observed on one or more candidate paths of the plurality of candidate paths for the communication session with a machine learning-based interface selection process to produce path recommendation information indicating whether one or more candidate paths of the plurality of candidate paths should or should not be used for the communication session between the first endpoint and the second endpoint;

wherein analyzing the candidate path information with the machine learning-based interface selection process includes using:

at least information associated with a type of data transmission for the communication session between the first endpoint and the second endpoint; and desired flow characteristics for the communication session between the first endpoint and the second endpoint, wherein the flow characteristics include one or more of end-to-end packet delay, jitter, latency, acceptable packet loss percentage, or desired media codec;

supply the path recommendation information to an endpoint that is responsible for path selection in the communication session; and establish the communication session between the first endpoint and the second endpoint according to the path recommendation information.

14. The apparatus of claim 13, wherein the processor is configured to receive from any endpoint, communication session quality data indicating a quality of the communication session, and wherein the processor is configured to analyze based further on the communication session quality data.

15. The apparatus of claim 14, wherein the processor is configured to receive, for use by the machine learning-based interface selection process, historical and training data pertaining to communication sessions conducted over paths in the network.

16. The apparatus of claim 14, wherein the processor is configured to classify candidate paths of the plurality of candidate paths to different classes based on the communication session quality data, and to produce the path recommendation information based on the classification, type of communication session, and the desired flow characteristics of the communication session.

17. One or more non-transitory computer readable storage media encoded with instructions that, when executed by a processor, cause the processor to:

upon initiating a communication session between at least a first endpoint and a second endpoint, either or both of which is behind at least one network device in a network that performs network address translation, obtain candidate path information associated with a plurality of candidate paths in the network through which the communication session can traverse, taking into account network address translation occurring in the network;

analyze the candidate path information using (i) training data for the plurality of candidate paths, and (ii) data about conditions observed on one or more candidate paths of the plurality of candidate paths for the communication session with a machine learning-based interface selection process to produce path recommendation information indicating whether one or more candidate paths of the plurality of candidate paths should or should not be used for the communication session between the first endpoint and the second endpoint;

wherein analyzing the candidate path information with the machine learning-based interface selection process includes using:

at least information associated with a type of data transmission for the communication session between the first endpoint and the second endpoint and desired flow characteristics for the communication session between the first endpoint and the second endpoint, wherein the flow characteristics include one or more of end-to-end packet delay, jitter, latency, acceptable packet loss percentage, or desired media codec;

supply the path recommendation information to an endpoint that is responsible for path selection in the communication session; and establish the communication session between the first endpoint and the second endpoint according to the path recommendation information.

18. The computer readable storage media of claim 17, further comprising instructions operable to receive from any endpoint, communication session quality data indicating a quality of the communication session, and wherein the instructions operable to analyze are based further on the communication session quality data.

19. The computer readable storage media of claim 18, further comprising instructions operable to classify candidate paths of the plurality of candidate paths to different classes based on the communication session quality data, and to produce the path recommendation information based on the classification, type of communication session, and the desired flow characteristics of the communication session.

20. The computer readable storage media of claim 18, further comprising instructions operable to receive, for use by the machine learning-based interface selection process, historical and training data pertaining to communication sessions conducted over paths in the network.

* * * * *

UNITED STATES PATENT AND TRADEMARK OFFICE
CERTIFICATE OF CORRECTION

PATENT NO. : 10,305,782 B2
APPLICATION NO. : 15/429284
DATED : May 28, 2019
INVENTOR(S) : Kaustubh Inamdar et al.

It is certified that error appears in the above-identified patent and that said Letters Patent is hereby corrected as shown below:

In the Claims

Claim 17, Column 14, Line 25, please replace "the second endpoint and" with --the second endpoint; and--

Signed and Sealed this
Thirtieth Day of July, 2019

Andrei Iancu
*Director of the United States Patent and Trademark Office*